United States Patent [19]

Bianchi

[11] 3,872,537

[45] Mar. 25, 1975

[54] WINDSCREEN WIPER

[75] Inventor: Angelo Bianchi, Lugano, Switzerland

[73] Assignee: Trapez Anstalt, Vaduz, Liechtenstein

[22] Filed: Feb. 7, 1974

[21] Appl. No.: 440,305

[30] Foreign Application Priority Data
Feb. 12, 1973 Switzerland.......................... 2050/73

[52] U.S. Cl........... 15/250.42, 15/250.32, 15/250.36
[51] Int. Cl.............................. B60s 1/38, B60s 1/40
[58] Field of Search........ 15/250.32, 250.34, 250.35, 15/250.36, 250.38, 250.42

[56] References Cited
UNITED STATES PATENTS

| | | | |
|---|---|---|---|
| 15,331 | 4/1922 | Demand.................... | 15/250.36 UX |
| 2,543,383 | 2/1951 | Scinta et al................. | 15/250.42 X |
| 2,966,692 | 1/1961 | Zaiger............................. | 15/250.36 |
| 3,104,412 | 9/1963 | Hinder............................. | 15/250.42 |
| 3,387,316 | 6/1968 | Pearse............................. | 15/250.36 |
| 3,757,377 | 9/1973 | Hayhurst......................... | 15/250.32 |

*Primary Examiner*—Peter Feldman
*Attorney, Agent, or Firm*—Werner W. Kleeman

[57] ABSTRACT

A windscreen wiper composed of only three components, namely a holder, a flexible wiper blade which is detachably secured at the holder and an element for securing the holder at the pivotable wiper arm of the windscreen wiper and which is articulated at the center of the holder. The holder and the securing element are fabricated of plastic and each are formed as a one-piece element. The holder possesses two adjacently arranged curved or arcuate elements which are interconnected with one another at different points or locations with the aid of connecting bridges. The height of such curved elements increases from the ends thereof towards the center and each such curved element is provided with at least one flange or vane along its lower edge, and each flange or vane fits into a lateral groove or recess of the wiper blade in order to retain the upper portion of such wiper blade in the space between the curved or arcuate elements.

19 Claims, 11 Drawing Figures

PATENTED MAR 25 1975

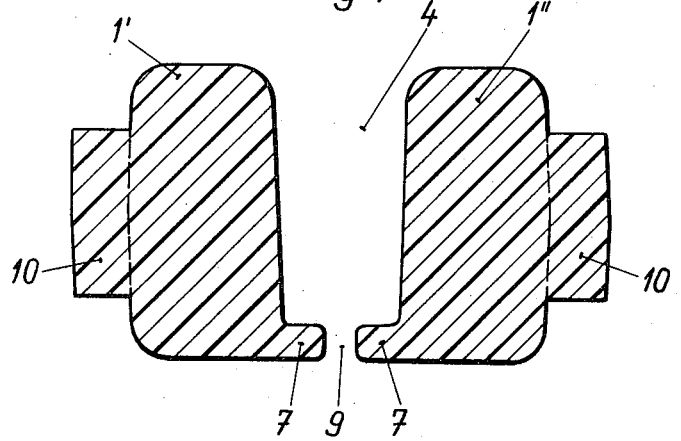
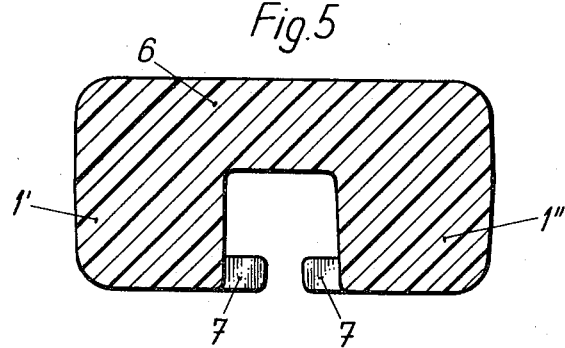
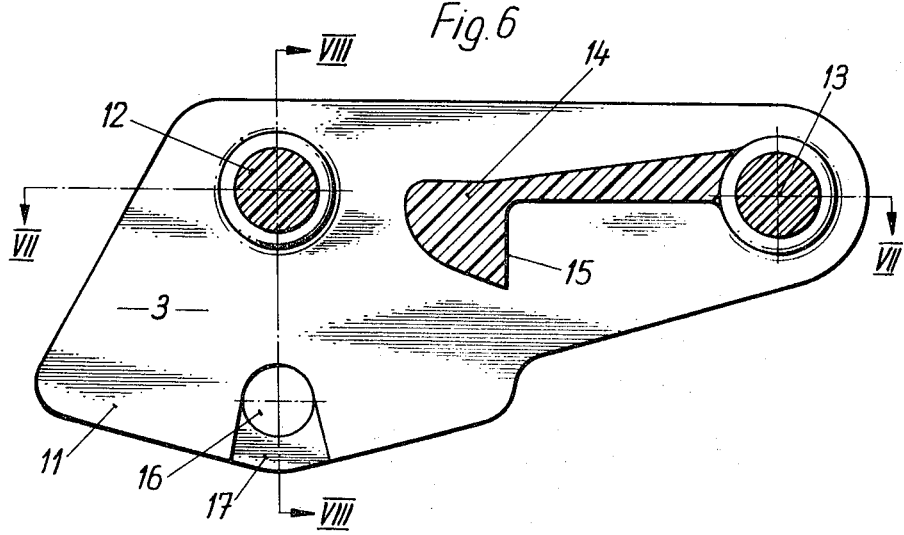

3,872,537

WINDSCREEN WIPER

BACKGROUND AND SUMMARY OF THE INVENTION

The present invention is in the field of windscreen or windshield wipers and, in particular, relates to a new and improved construction of windscreen wiper of the type composed of only three components or parts, namely a curved or arcuate holder, a flexible wiper blade formed of rubber which is detachably secured at the holder and an attachment element or component for securing the holder to the pivotal or oscillating wiper arm, the attachment element being hingedly connected at the central region of the holder, the holder and the attachment element being fabricated of plastic and each being produced as a one-piece molded component.

A primary objective of the invention is to provide a new and improved construction of windscreen wiper which can be easily manufactured, especially because of its only being formed of three components.

Another object of the present invention is directed to the provision of a new and improved construction of wiper which can be easily secured to the wiper arm.

Yet a further significant object of the present invention relates to a windscreen wiper which is of relatively simple construction and design, economical to manufacture, extremely reliable in operation, and easy to mount and dismantle at the wiper arm of the vehicle or other object where it is used.

Now in order to implement these and still further objects of the invention, which will become more readily apparent as the description proceeds, the wiper of this development is manifested by the features that the holder or frame is formed of two adjacently situated curved or arcuate elements which are connected with one another at different points or locations with the aid of connecting bridges, that the height of such curved elements increases from the ends thereof towards the center thereof, and that each such curved element possesses at least one flange or vane which extends along its lower edge and which protrudes into a lateral recess or groove provided at the wiper blade in order to retain the upper part of such wiper blade in the space between the curved elements.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 4 is an enlarged cross-sectional view of the wiper holder depicted in FIGS. 1 to 3, taken substantially along the line IV—IV of FIG. 2;

FIG. 5 is an enlarged cross-sectional view of the wiper holder depicted in FIGS. 1 to 3, taken substantially along the line V—V of FIG. 2;

FIG. 6 is a cross-sectional view through the central plane of a first exemplary embodiment of attachment element;

DETAILED DESCRIPTION OF THE PREFERRED EMBODIMENTS

Describing now the drawings, the exemplary embodiment of windscreen or windshield wiper of this development is to be understood as being composed of only three components or parts, to wit, the wiper holder or frame 1, the flexible wiper blade 2 and the attachment element or coupling 3 which releasably connects the holder 1 and wiper blade 2 with the wiper arm which oscillates back and forth in conventional fashion.

Figure 1:
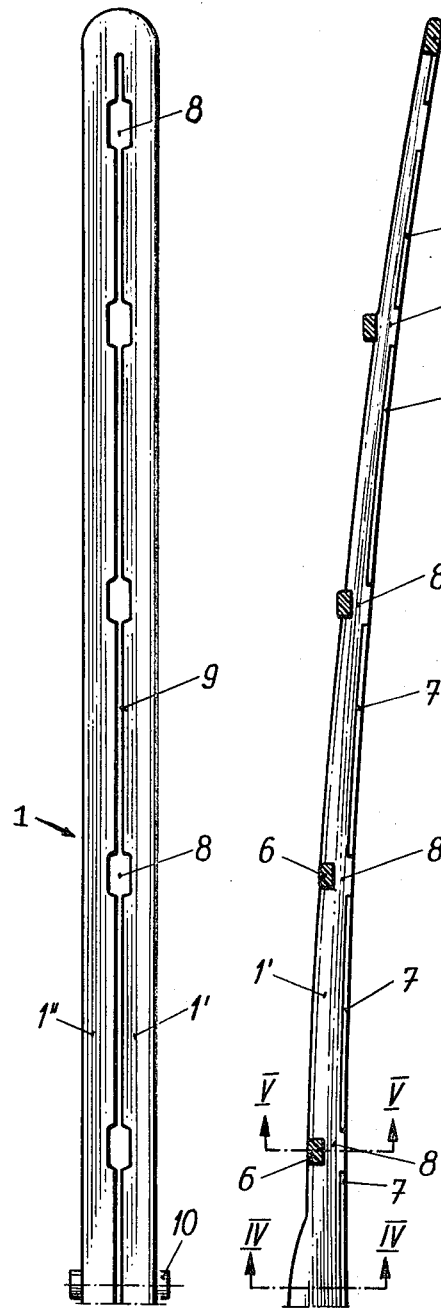
FIG. 1 illustrates one-half of the holder as viewed from the bottom thereof.
Figure 2:
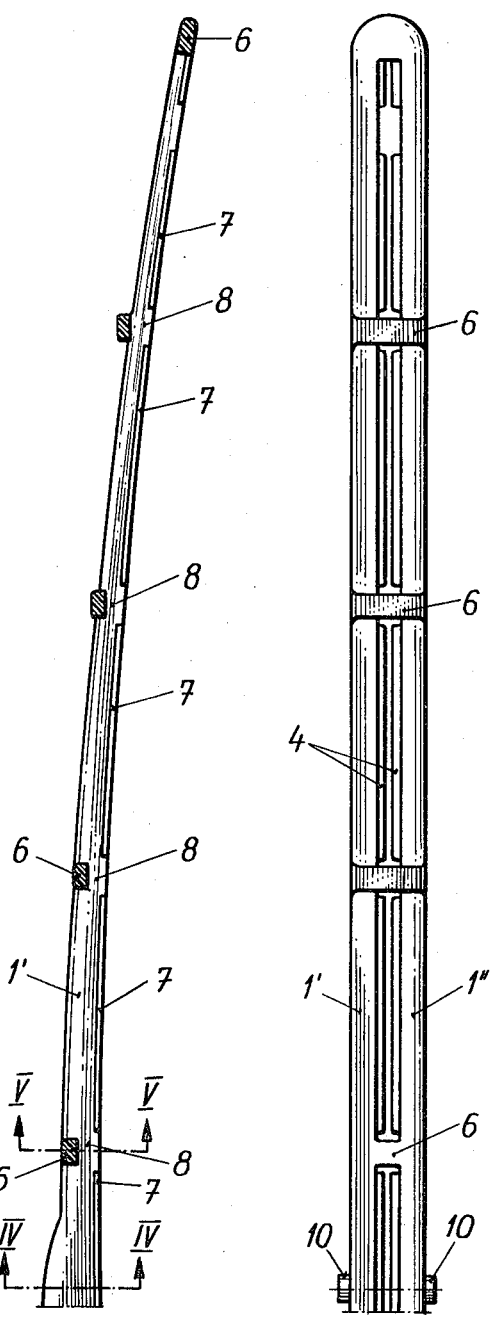
FIG. 2 illustrates one-half of the holder shown in FIG. 1, but this time in vertical sectional view.
Figure 3:
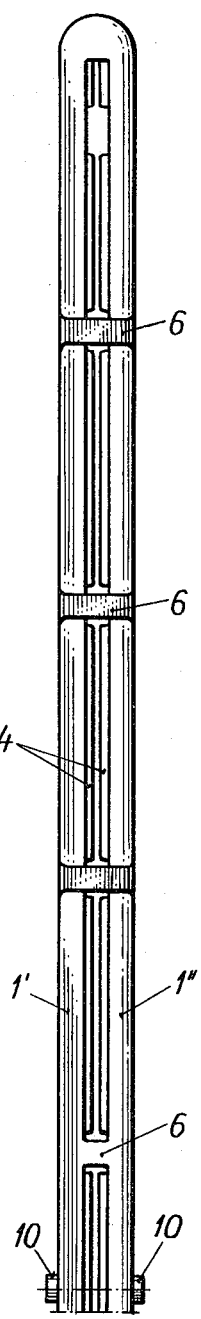
FIG. 3 illustrates one-half of the holder as shown in FIG. 1 but as viewed from above.

The wiper holder or frame 1 is composed of two curved or arcuate elements 1' and 1" which are situated alongside of one another, that is to say in side-by-side relationship, as best seen by referring to FIG. 1, and these curved elements are interconnected with one another at various points along the length of the holder 1 by means of connecting bridges or connecting straps 6 or equivalent structure. Each curved element possesses a cross-section such that the height thereof, starting from the ends or extremities, progressively increases towards the center or central region thereof, in order to insure that there is present a uniform transmission of pressure from the holder 1 to the wiper blade 2. In this way there is insured that the wiper blade will exert, over its entire length, a substantially uniform pressure upon the windscreen or windshield which is to be cleaned. The space or gap 4 between the curved elements 1' and 1" of the holder 1 possesses a substantially constant width and houses the base or spine of the wiper blade 2, the details of which will be discussed more fully hereinafter.

Each curved holder element 1' and 1" will be understood to be provided at its lower edge at its inside region with a flange or vane 7, as best seen by referring to FIGS. 4 and 5. Each such flange 7 extends into the intermediate space or gap 4 and is interrupted at various points or locations at the region of each connecting bridge or strap 7 interconnecting the two holder elements 1' and 1" and at the vicinity of the terminal or end connecting bridges. These flanges 7 form therebetween a slot 9 of substantially constant width and at which slot there is retained the center of the wiper blade, in other words into which there is inserted the base or spine of such wiper blade. The interruptions which are provided at the flanges 7 form substantially rectangular windows or spaces 8 having a width corresponding to that of the intermediate space or gap 4. Both of the outermost situated windows or spaces 8 are longer than the intermediate windows or spaces and serve to permit introduction of the wiper blade into the holder 1. The radius of curvature of the curved elements 1' and 1" is substantially constant (amounting to approximately 1,000 millimeters for the windshields or windscreens conventionally employed at the present time) and the height of the cross-section of such curved elements increases from the ends or extremities towards the center thereof. At the central region of the holder 1 there are mounted two coaxial hinge or pivot pins 10 which protrude from the side surfaces of the holder and with which cooperate the attachment element or coupling 3.

The wiper holder or frame 1 is manufactured from a plastic, preferably polycarbonate, and is produced as a one-piece or integral part by injection molding. The shape of the different parts of the holder has been designed such that it can be produced in a single working operation with the aid of a relatively simple injection mold. In its most common version such holder is produced in black plastic. But it is to be specifically understood that the color of the plastic is of no significance to the underlying concepts of the invention and therefore other colors can be employed or such component can also have a metallic finish.

Figure 7:
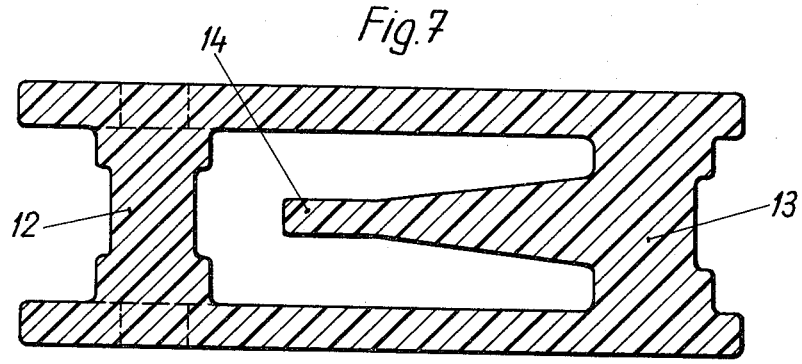
FIG. 7 is a cross-sectional view of the attachment element or coupling shown in FIG. 6, taken substantially along the line VII—VII thereof.
Figure 8:
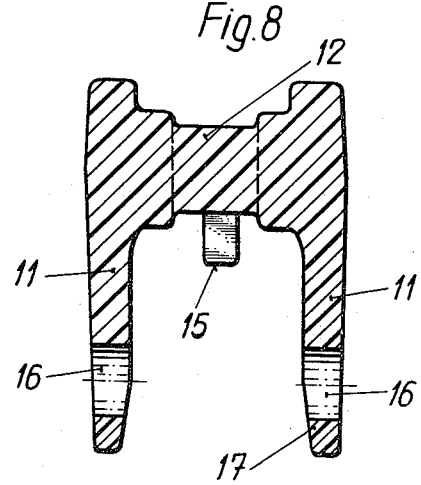
FIG. 8 is a cross-sectional view of the attachment element or coupling shown in FIG. 6, taken substantially along the line VIII—VIII thereof.

The attachment element or coupling 3 is likewise advantageously fabricated as a one-piece component in an injection molding operation, and is formed of a suitable plastic, preferably black polycarbonate. In the exemplary embodiment of attachment element shown in FIGS. 6, 7 and 8, and which is suitable for use with wiper arms of the type produced in Germany, i.e., with curved tips, such coupling comprises two side pieces or flanges 11 which are interconnected with one another at the region of their upper ends by the two connecting bridges or straps 12 and 13. An elastic tongue member 14 is provided at the bridge or strap 13, this tongue member or tongue 14 extending almost within a few millimeters of the other connecting bridge or strap 12 and forming a nose member or nose 15. This tongue 14 possesses an elastic construction in order that the curved end of the wiper arm can be introduced between the nose member 15 and the bridge 12. Thereafter the wiper arm is connected with the tongue 14 in that the nose member 15 is introduced into a gap of the curved end of the wiper arm. Hence, the attachment element or coupling can thus be stably connected with the wiper arm by carrying out a very simple manipulation. Both of the side pieces or flanges 11 each have a hole or bore 16 which can cooperate with one of the pivot pins 10 of the wiper holder 1. The attachment element or coupling 3 is manually pushed down onto the central portion of the holder 1. Owing to its flexibility and by virtue of the provision of the inclined surface or guide surface 17 beneath each hole 16 the side pieces or flanges 11 of the coupling 3 can flex out over the pivot pins 10 which then engage with the holes or bores 16.

Figure 9:
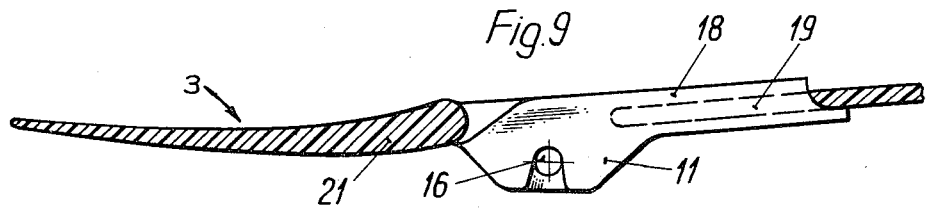
FIG. 9 is a cross-sectional view substantially through the central plane of a second exemplary embodiment of attachment element or coupling.
Figure 10:
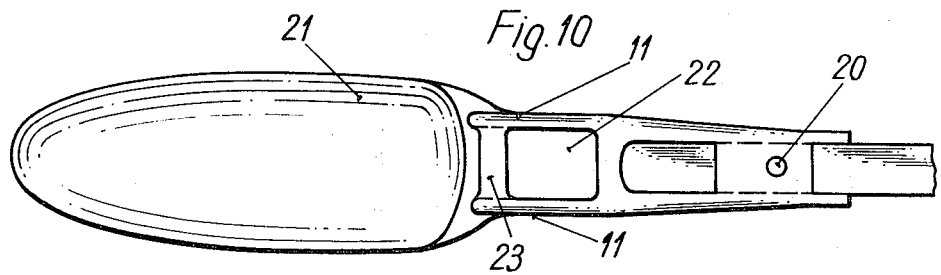
FIG. 10 is a top plan view of the attachment element or coupling portrayed in FIG. 9.

In the exemplary embodiment depicted in FIGS. 9 and 10 and suitable for use with straight wiper arms (European type) the attachment element or coupling 3 possesses two side pieces or flanges 11 equipped with the holes or bores 16 and intended to receive the hinge or pivot pins 10 and a tab or arm 18. The side pieces or flanges 11 are connected or formed in one-piece with the tab or arm 18 and are further connected by a bridge or strap 23, wherein such bridge 23 together with the side pieces or flanges 11 and the arm 18 delimit a window or space 22. The arm or tab 18 possesses an axial recess or groove having a substantially rectangular cross-sectional configuration, as indicated generally by reference character 19, and which is designed to house the wiper arm. The upper wall of this recess is equipped with a hole or bore 20 serving to receive a projection or knob at the end portion of the wiper arm in order to be able to fix to the wiper arm the attachment element or coupling for the wiper holder which is articulated with the attachment element. In order to mount the attachment element at the holder there is likewise provided the previously mentioned pair of holes or bores 16 at the side pieces or flanges 11.

Both types of couplings or attachment elements can be equipped with a concave vane or blade 21 at the far side of the wiper arm. This vane or blade 21 is also formed of plastic and is integrally constructed with the coupling or attachment element itself. This vane or blade 21 has a convex face or surface which is directed towards the windshield or windscreen. When the wiper is used at high speeds, exceeding 150 kilometers per hour, the vane, owing to its reverse wing-shape or contour, and which is subjected to an aerodynamic effect, produces a force or pressure which is directed essentially at right angles in the direction of the windshield, resulting in an increased contact of the wiper blade at the windshield or windscreen.

The position and size of the vane are selected such that there is realized the desired effect without impairing visibility, this being in contrast to other types of prior art contact vanes secured to the wiper arm. In the exemplary embodiment of attachment element or coupling as illustrated in FIGS. 9 and 10 the window or space 22 provides an air passage and thus assists in obtaining the desired effect.

Moreover, the attachment element or coupling is constructed and dimensioned in such a manner that upon lifting the wiper arm or support, for instance in order to be able to clean the windshield with the aid of a cloth or the like, the wiper holder can only swivel through a small angle with regard to the wiper arm, for instance through an angle of about 20° to 22°. When the wiper arm is again lowered so as to bear against the windscreen, the non-rotated wiper automatically assumes the correct position at the windshield.

Figure 11:
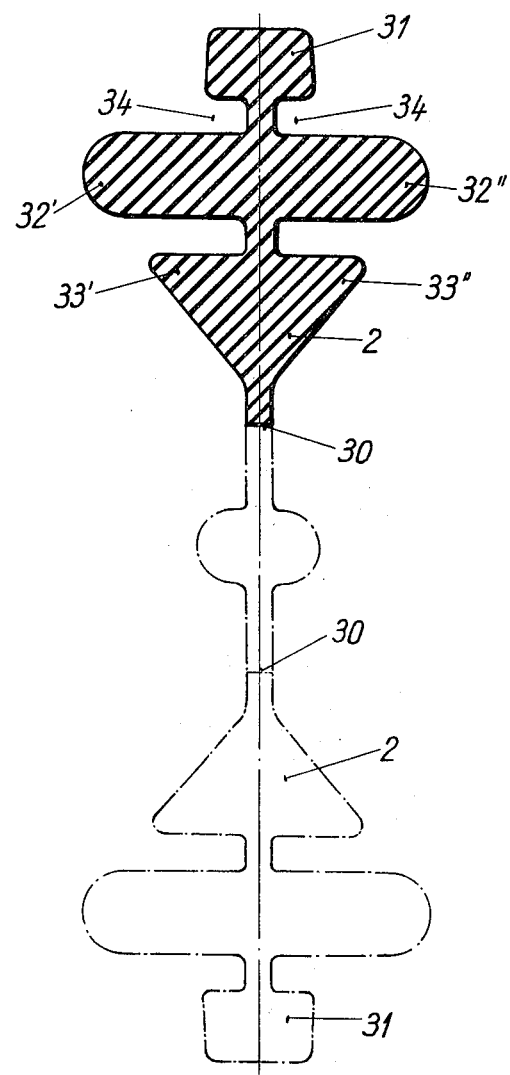
FIG. 11 illustrates details of the wiper blade formed of rubber.

The profile of the wiper blade 2, as viewed in cross-section, assumes the shape shown in FIG. 11. At the side opposite the lip or tongue 30 which bears against the windshield or windscreen, the wiper possesses a thickened or enlarged portion 31 which is housed in the intermediate space or gap 4 and bears against the flanges 7. Beneath the head there are provided two ribs 32' and 32" which protrude at right angles to the central plane of the wiper blade and which press against the lower surface of the flanges 7. Directly beneath these ribs 32' and 32" there are provided two triangular ribs 33' and 33" which limit the deformation of the rubber of the wiper blade when pressed against either the one or the other of the ribs 32' and 32", depending upon the direction of movement of the blade.

Attachment of the wiper blade at the holder is undertaken manually in that the head 31 is introduced into the intermediate space or gap 4 through one of the endmost windows or openings and then the entire blade is slid into the holder. The flanges 7 protrude into the recesses or grooves 34. Once the wiper blade has been mounted it cannot fall out since its ends are held by the end bridges of the holder. The wiper blade is produced by injection molding in a mold or by extrusion so as to possess a double profile configuration, as best seen by referring to FIG. 11. This profile member is then suitably processed so as to impart thereto sufficient slipperiness or gliding properties in order to be able to wipe an almost dry windshield. If the profile member is formed of a band, in other words is produced as a continuous piece, then it is cut to the desired lengths (1 or 2 millimeters shorter than the length of the intermediate space or gap 4). These cut lengths or the double blades obtained by molding, are then cut lengthwise so as to produce single blades. If necessary, the lip or tongue 30 can be further processed during an additional working operation or step.

It has been found advantageous if the outer and inner contours of the curved elements of one-half of the wiper at least approximately correspond to a respective arc of the same radius, the center points of which are offset with regard to one another. On the one hand, it is easier to produce high precision molds in which there are to be machined circular arcs. On the other hand, it has been surprisingly found by empirically measuring all possible windshield wiper constructions at a multiplicity of windshields which are conventional in the market place that the average value of the curves correspond to an arc with a radius between 900 millimeters and 1,300 millimeters, usually between 1,000 millimeters and 1,100 millimeters.

Furthermore, it has been found that when dimensioning the height of the curved elements such should be directly proportional to the angle which is formed by the radius between the imaginary center of the inner contour and the end of the curved element on the one hand and the radius which migrates out of this position to the center of the curved element on the other hand. By a virtue of these measures there can be realized an optimum distribution of the elasticity and thus the accommodation of the wiper at windscreens or windshields possessing different curvatures.

It is not only advantageous to fabricate the holder from plastic having a permanent elasticity, which at least approximately corresponds to that of polycarbonate, but furthermore the plastic should possess the properties which are normally expected of a windshield wiper as concerns strength and weather resistance. However, the desired elasticity is of particular importance because the one-piece construction of the holder will only then optimumly and universally function, that is to say in conjunction with as large as possible number of different windscreens, if the contact pressures exerted by the wiper arms insure for a uniform wiping effect from the center to the edge of the wiper.

Additionally, it has been found that the height of the curved elements at the ends of the wiper should amount to between 1.6 millimeters and 2.5 millimeters, preferably between 1.9 millimeters and 2.3 millimeters. A thinner tapering of the holder does not provide sufficient strength, whereas a more pronounced dimensioning would render more difficult accommodation of the wiper construction to windscreens having greater curvatures.

It is also advantageous if the height of the curved or arcuate elements at the center of the wiper varies, as a function of the length of the wiper, between about 4.0 millimeters and 8.0 millimeters, preferably between 4.5 millimeters and 6.5 millimeters, wherein the relationship between the length of the wiper and the height of the curved elements at their center is preferably greater than 60. If for instance there is selected for the most frequently used wiper lengths of 11", 13" and 15" (corresponding to 290 millimeters, 340 millimeters and 390 millimeters respectively) an arc thickness which at its center does not provide any such ratio which exceeds 60 as previously explained, then there can no longer be insured for a sufficient strength of the wiper against torsion.

For the same reason it has been found to be advantageous if with increasing length of the wiper from its ends towards the center the height of the bridges increase and/or their spacing decreases. On the other hand, a reinforcement of the bridges at the end of the wiper would reduce the accommodatability of the wiper to the curvatures of the windscreens.

Since the bridges at least locally reduce the elasticity of the holder and thus the wiper, they should be arranged at a spacing of at least 20 millimeters, preferably between 35 millimeters and 40 millimeters; if the spacing amounts to more than 50 millimeters, then again the resistance of the wiper against torsion effects is impaired.

It has been surprisingly found that for all of the most frequently employed wiper lengths the difference between the height of the curved elements and the height of the bridges at the center of the wiper should be in a range between 3 millimeters and 3.5 millimeters, preferably between 3.2 millimeters and 3.3 millimeters, even if the height of the bridges at both ends of the wiper—as has been explained above—can be essentially maintained constant and is dependent to a greater extent upon the selected material than the wiper length.

Finally, it is to be remarked that the described wiper can be fabricated in a particularly rational manner if the flanges are interrupted at right angles to the intermediate bridges in such a manner that the gap between the front flanges is interrupted by windows of greater width, which preferably are arranged beneath the bridges, wherein the windows located at the ends are longer than the others in order to be able to introduce the wiper blade into the space between the curved elements and to slide such wiper blade onto the flanges. Consequently, there is not only realized a saving in material and an improvement in the flexibility of the wiper, but furthermore the holder can also be fabricated in only a two-part mold.

The advantages and features of the windscreen wiper heretofore described can be summed up as follows:

1. Simplicity of manufacture: It consists of only three components or parts, one formed of rubber and two of a suitable plastic. This insures for a really good functioning of the wiper, even when encountering the worst possible conditions, over rough ground or on dirty roads, when the road is covered with ice, snow or sand. Almost all of the wipers which have heretofore been used have been composed of not less than ten parts which are interconnected with one another by rivets, springs and the like, and such type connection elements are completely lacking with the wiper construction of this development.

2. Low cost of manufacture: This is one of the most obvious and striking features. The fabrication costs are roughly proportional to the required number of parts needed for producing the wiper. The fact that there are only three parts or components which form the wiper of the invention provides advantages not only from the standpoint of production costs, but also with respect to assembly and fitting costs.

3. Aerodynamic characteristics: Whether the wipers are produced with the normal coupling or with the high-speed type coupling, the wiper constructions of this development are much more adherent to the windshield than any other known type of wiper which is presently available in the market, since its simple structure produces less drag than that created by the traditional type prior art wiper constructions. Hence the possibility of using such wipers in conjunction with sports cars, racing cars and aeroplanes of the type fitted with the concave-convex vane should be evident.

4. Mechanical strength: Such is considerably greater than that of known constructions formed of metal. This has been established in practice by carrying out tests during which the wiper was subjected a number of times to extreme deformations, beyond those which could be normally expected to be encountered in practice. Even under these conditions, which can be compared to those which prevail when the windshield is markedly covered with ice, there was found that cleaning of the windshield was always extremely good. In contrast thereto, it is well known that with conventional wiper constructions a single external deformation can permanently impair the mode of operation of the wiper.

5. Lightweight construction: The total weight of the wiper amounts to approximately one-third of that of comparable conventional models. Obviously this has no great influence upon the overall weight of the vehicle, but on the other hand it does have importance with respect to the power requirements of the motor of the wiper and the control linkages. Since the windshield wiper must carry out a to-and-fro movement and during each reversal in movement, owing to the inertia of the movable masses, the electrical energy taken-up by the motor is wasted.

6. Resistance to extreme temperatures: The wiper constructions of this development are able to continuously function at temperatures in the range of −35°C to +70°C. There is no need to be concerned about the free working of the joints and linkages which are present at conventional wiper constructions.

7. Resistance to ozone and other corroding elements in the air: Such is extremely high owing to the employed materials. Since there are no metal parts there is not present the problem of providing special plating, such as copper, nickel and so forth as is known, and accordingly the fabrication costs are lowered.

8. Appearance: It is considerably more attractive than that of conventional windscreen wipers. This is not only due to the fact that the one-piece holder does not noticeably protrude from the surface wiped by the blade, but also due to the fact that the surface of the holder can be produced with a very slight matt finish, which can be easily obtained by using a mold having a roughened surface. Furthermore, there is no difficulty whatsoever in producing other color shades apart from the black color described above, such as green, red and so forth, for instance for sports cars.

9. Wiping efficiency: Compared with that of prior art constructions the efficiency of the wiper as concerns its wiping action is extremely high. Indeed, the wiper action of the wiper constructions which have been described with tests which have been carried out (without however undertaking any particular measurements, which of course can be performed at any time) is at least as effective, if not better, than that which can be realized with the known, most complex and expensive models presently available on the market.

10. Suitability of the wiper for mass production: In practice the wiper construction of this development can use the same coupling and the same blade (obviously cut to the required length) for 11", 13", 15" and 19" constructional types. Consequently, the fabrication during mass-production is simplified. For instance, as a practical example it should be noted that when using two thermoplastic machines working 8 hours it is possible to produce as many as 4,000 wipers. Similar observations can be made with regard to the production of the rubber wiper blade, especially if the same is produced by extrusion.

While there is shown and described present preferred embodiments of the invention, it is to be distinctly understood that the invention is not limited thereto but may be otherwise variously embodied and practiced within the scope of the following claims.

What is claimed is:

1. A windscreen wiper composed of three components, said three components comprising a holder, a flexible wiper blade detachably secured at the holder, and an attachment element for securing the holder at a movable wiper arm of the windshield wiper and which attachment element is hingedly connected at the central region of the holder, said holder and said attachment element being fabricated of plastic and each formed as a onepiece element, said holder possessing two adjacently arranged curved elements defining a space therebetween, connecting bridge means for interconnecting said curved elements with one another at different locations along the length thereof, the height of said curved elements increasing from the ends towards the central region thereof, each curved element having a lower edge and equipped with at least one flange extending along said lower edge, said wiper blade having lateral arranged recess means, said flange of each curved element extending into said laterally arranged recess means of the wiper blade in order to retain an upper part of said wiper blade in the space between the curved elements.

2. The windscreen wiper as defined in claim 1, wherein the curved elements have an outer contour and an inner contour which at least approximately correspond to an arc of a respective circle, the center points of which are offset with respect to one another.

3. The windscreen wiper as defined in claim 2, wherein the arc radius is in a range of 900 mm to 1,300 mm.

4. The windscreen wiper as defined in claim 3, wherein the arc radius is in a range between 1,000 mm and 1,100 mm.

5. The windscreen wiper as defined in claim 1, wherein the increase of the height of the curved elements is directly proportional to the angle formed by a radius between the imaginary center point of the inner contour and the end of the curved elements and the radius which migrates out of this position to the center of the curved elements.

6. The windscreen wiper as defined in claim 1, wherein said holder is formed of plastic exhibiting a permanent deformation corresponding approximately at least to that of polycarbonate.

7. The windscreen wiper as defined in claim 1, wherein the height of the curved elements at the end of the wiper is in the order of between 1.6 mm and 2.5 mm.

8. The windscreen wiper as defined in claim 7, wherein the height of the curved elements at the ends of the wiper is in the order of between 1.9 mm and 2.3 mm.

9. The windscreen wiper as defined in claim 1, wherein the height of the curved elements at the center of the wiper varies as a function of the length of the wiper and is in the order of between 4.0 mm and 8.0 mm, wherein the ratio between the wiper length and the height of the curved elements at their center exceeds 60.

10. The windscreen wiper as defined in claim 9, wherein the height of the curved elements at the center of the wiper varies as a function of the wiper length between 4.5 mm and 6.5 mm.

11. The windscreen wiper as defined in claim 1, wherein said connecting bridge means are arranged in spaced relationship from one another at a spacing in the order of 20 mm to 50 mm.

12. The windscreen wiper as defined in claim 11, wherein said connecting bridge means are arranged in spaced relationship from one another at a spacing in the order of 35 mm to 40 mm.

13. The windscreen wiper as defined in claim 1, wherein with increasing length of the wiper from its ends towards the center thereof at least the height of the connecting bridge means increases.

14. The windscreen wiper as defined in claim 1, wherein with increasing length of the wiper from its ends towards the center thereof at least the spacing of the connecting bridge means from one another decreases.

15. The windscreen wiper as defined in claim 1, wherein the difference between the height of the curved elements and the height of the connecting bridge means at the center of the wiper is in the order of between 3 mm and 3.5 mm.

16. The windscreen wiper as defined in claim 15, wherein said difference is in the order of between 3.2 mm and 3.3 mm.

17. The windscreen wiper as defined in claim 1, wherein said flanges are interrupted at substantially right angles to the connecting bridge means located intermediate the ends of the wiper in such a manner that a gap between the front flanges is interrupted by windows of greater width, wherein windows located at the ends of the wiper are longer than the other windows in order to be able to introduce the wiper blade into the space between the curved elements and to slide such wiper blade onto the flanges.

18. The windscreen wiper as defined in claim 17, wherein the greater width windows are arranged below the connecting bridge means.

19. A windscreen wiper composed of three components, said three components comprising a holder, a wiper blade detachably secured at the holder, and an attachment element for securing the holder at a movable wiper arm of the windshield wiper, said holder possessing two adjacently arranged curved elements defining a space therebetween, connecting means for interconnecting said curved elements with one another at different locations along the length thereof, the height of said curved elements increasing from the ends towards the central region thereof, each curved element having a lower edge and equipped with at least one flange extending along said lower edge, said wiper blade having lateral arranged recess means, said flange of each curved element extending into said laterally arranged recess means of the wiper blade in order to retain said wiper blade at the curved elements.

* * * * *